(12) United States Patent
Kim

(10) Patent No.: US 11,010,707 B1
(45) Date of Patent: May 18, 2021

(54) SYSTEMS AND METHODS FOR INTERCONNECTING NETWORK DEVICES BASED ON QUEUING AND SERVICING RESPONSES

(71) Applicant: COUPANG CORP., Seoul (KR)

(72) Inventor: Tae Kyung Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/806,631

(22) Filed: Mar. 2, 2020

(51) Int. Cl.
*G06Q 30/00* (2012.01)
*G06Q 10/08* (2012.01)
*G06Q 30/06* (2012.01)
*H04L 29/06* (2006.01)
*H04L 12/58* (2006.01)

(52) U.S. Cl.
CPC ..... *G06Q 10/0838* (2013.01); *G06Q 30/0637* (2013.01); *H04L 51/02* (2013.01); *H04L 65/1066* (2013.01)

(58) Field of Classification Search
CPC .. G06Q 30/0601–0645; G06Q 10/0838; H04L 51/02; H04L 65/1066
USPC ............................................ 705/26.1–27.2
See application file for complete search history.

(56) References Cited

U.S. PATENT DOCUMENTS

| 8,271,336 | B2 * | 9/2012 | Mikurak | ........... G06Q 1/14 705/22 |
| 2007/0106568 | A1 * | 5/2007 | Asher | .............. G06Q 30/02 705/26.81 |
| 2016/0063435 | A1 * | 3/2016 | Shah | ............... G07F 17/40 705/44 |
| 2017/0208014 | A1 | 7/2017 | Chattaraj et al. | |
| 2018/0107979 | A1 * | 4/2018 | Westover | ........... H04L 51/20 |

(Continued)

FOREIGN PATENT DOCUMENTS

| KR | 10-2011-0065448 A | 6/2011 |
| KR | 10-2014-0133048 A | 11/2014 |

OTHER PUBLICATIONS

Edinger, Janick. "Context-Aware Task Scheduling in Distributed Computing Systems." Order No. 27526242 Universitaet Mannheim (Germany), 2019. Ann Arbor: ProQuest. (Year: 2019).*

(Continued)

*Primary Examiner* — Jeffrey A. Smith
*Assistant Examiner* — Kennedy Gibson-Wynn
(74) *Attorney, Agent, or Firm* — Finnegan, Henderson, Farabow, Garrett & Dunner, LLP

(57) ABSTRACT

A system for interconnecting network devices based on queuing and servicing responses includes one or more processors configured to receive, from a first computer system, an order request for a product or service associated with a second computer system of a plurality of second computer systems. Instantiate an order messaging queue associated with the order request and add an identifier of the first computer system to the order messaging queue. Add an identifier of the second computer system and one of the third computer systems to the order messaging queue. Determine the contents of the communication and based on determining contents of the communication, consult a response rule table to determine a response to the communication. Access the order messaging queue to identify server devices corresponding with servicing the determined response and publish, to the identified server devices.

19 Claims, 9 Drawing Sheets

(56) References Cited

U.S. PATENT DOCUMENTS

2018/0295084 A1 10/2018 Gourevitch et al.
2019/0238495 A1 8/2019 Zhang et al.

OTHER PUBLICATIONS

Search Report dated Aug. 18, 2020, for Korean Patent Application No. 10-2020-0055451 (9 pp).

* cited by examiner

SYSTEMS AND METHODS FOR INTERCONNECTING NETWORK DEVICES BASED ON QUEUING AND SERVICING RESPONSES

TECHNICAL FIELD

Embodiments of the present disclosure relate to systems and methods for interconnecting network devices. More particularly, embodiments of the present disclosure relate to enabling users to order items online and deliver the items, by interconnecting network devices based on queuing and servicing responses.

BACKGROUND

Users (e.g., online customers, online merchants, delivery personnel) often use online website portals or mobile applications to order items (e.g. order food, grocery). By way of example, users maintain profiles that includes user information (e.g. location information, menu, name) at the online websites. An online ordering process requires multiple stages of online order processing, from when an order is placed to when the order is delivered.

In a situation where a user places an online order requesting food to be delivered, a first stage (of multiple stages) may be for a merchant (e.g. a restaurant) to confirm the order or reject the order based on their availability to process the order. Upon receiving a confirmation of the order from the merchant, a request is sent to a delivery personnel to confirm or reject a pickup of order from the merchant based on their availability, as part of a second stage. Similarly, through the various stages of processing of the online order there are various requests pushed and received across a network that results in utilization of numerous network resources. As these requests are pushed and received there are network delays between the responses that effect the network performance and thus negatively impacting user experience, which leads to inconvenience to the users.

Current solutions for managing online orders are generally ineffective in reducing and managing delays from the time an order is placed to the time the order is received by the user. In the current marketplace, processing of online orders is performed by various network devices across multiple networks, however there is no systematic method available that would reduce time delays between processing of orders across multiple network devices. Accordingly, current solutions for managing online order processing do not have the ability to consolidate, track, or analyze time delays and thus are ineffective, inflexible, and/or inefficient, resulting in reduced network processing efficiency. Moreover, there is a need for a system that monitors and reduces time delays incurred by merchants and delivery personnel.

SUMMARY

In accordance with embodiments of the present disclosure, there is provided a system for interconnecting network devices based on queuing and servicing responses, the system comprising: a memory storing instructions; and at least one processor configured to execute the instructions to: receive, from a first computer system of a plurality of first computer systems via a network, an order request for a product or service associated with a second computer system of a plurality of second computer systems; instantiate an order messaging queue associated with the order request and add an identifier of the first computer system to the order messaging queue; forward a confirmation request comprising the order request, via the network, to the second computer system; add an identifier of the second computer system to the order messaging queue; forward a second confirmation request associated with a plurality of tasks to a plurality of third systems; add an identifier of one of the third computer systems to the order messaging queue; upon receiving a communication from one of the first, second, or third computer systems: determine the contents of the communication; based on determining contents of the communication, consult a response rule table to determine a response to the communication; determine which of the first, second or third computer systems are associated with servicing the determined response; access the order messaging queue to identify server devices corresponding with the first, second or third computer systems for servicing the determined response; and publish, to the identified server devices, the determined response for servicing.

In accordance with embodiments of the present disclosure, there is also provided a computer implemented method for interconnecting network devices based on queuing and servicing responses, the method comprising: receiving, from a first computer system of a plurality of first computer systems via a network, an order request for a product or service associated with a second computer system of a plurality of second computer systems; instantiating an order messaging queue associated with the order request and add an identifier of the first computer system to the order messaging queue; forwarding a confirmation request comprising the order request, via the network, to the second computer system; adding an identifier of the second computer system to the order messaging queue; forwarding a second confirmation request associated with a plurality of tasks to a plurality of third systems; adding an identifier of one of the third computer systems to the order messaging queue; upon receiving a communication from one of the first, second, or third computer systems: determining the contents of the communication; based on determining contents of the communication, consult a response rule table to determine a response to the communication; determining which of the first, second or third computer systems are associated with servicing the determined response; accessing the order messaging queue to identify server devices corresponding with the first, second or third computer systems for servicing the determined response; and publishing, to the identified server devices, the determined response for servicing.

In accordance with embodiments of the present disclosure, there is provided a system for interconnecting network devices based on queuing and servicing responses, the system comprising: a memory storing instructions; and at least one processor configured to execute the instructions to: receive, from a first computer system of a plurality of first computer systems via a network, an order request for a product or service associated with a second computer system of a plurality of second computer systems; instantiate an order messaging queue associated with the order request and add an identifier of the first computer system to the order messaging queue; forward a confirmation request comprising the order request, via the network, to the second computer system; receive a response to the confirmation request from second computer system; add an identifier of the second computer system to the order messaging queue; forward a second confirmation request associated with a plurality of tasks to a plurality of third systems; receive a response to the second confirmation request from one of the third computer system; add an identifier of the one of the third computer systems to the order messaging queue; upon receiving a communication from one of the first, second, or third computer systems: determine the contents of the communication; based on determining contents of the communication, consult a response rule table to determine a response to the communication; determine which of the first, second or third computer systems are associated with servicing the determined response; access the order messaging queue to identify server devices corresponding with the first, second or third computer systems for servicing the determined response; and publish, to the identified server devices, the determined response for servicing.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following description is directed to receiving and propagating efficient search updates in real time, these embodiments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

Figure 1:
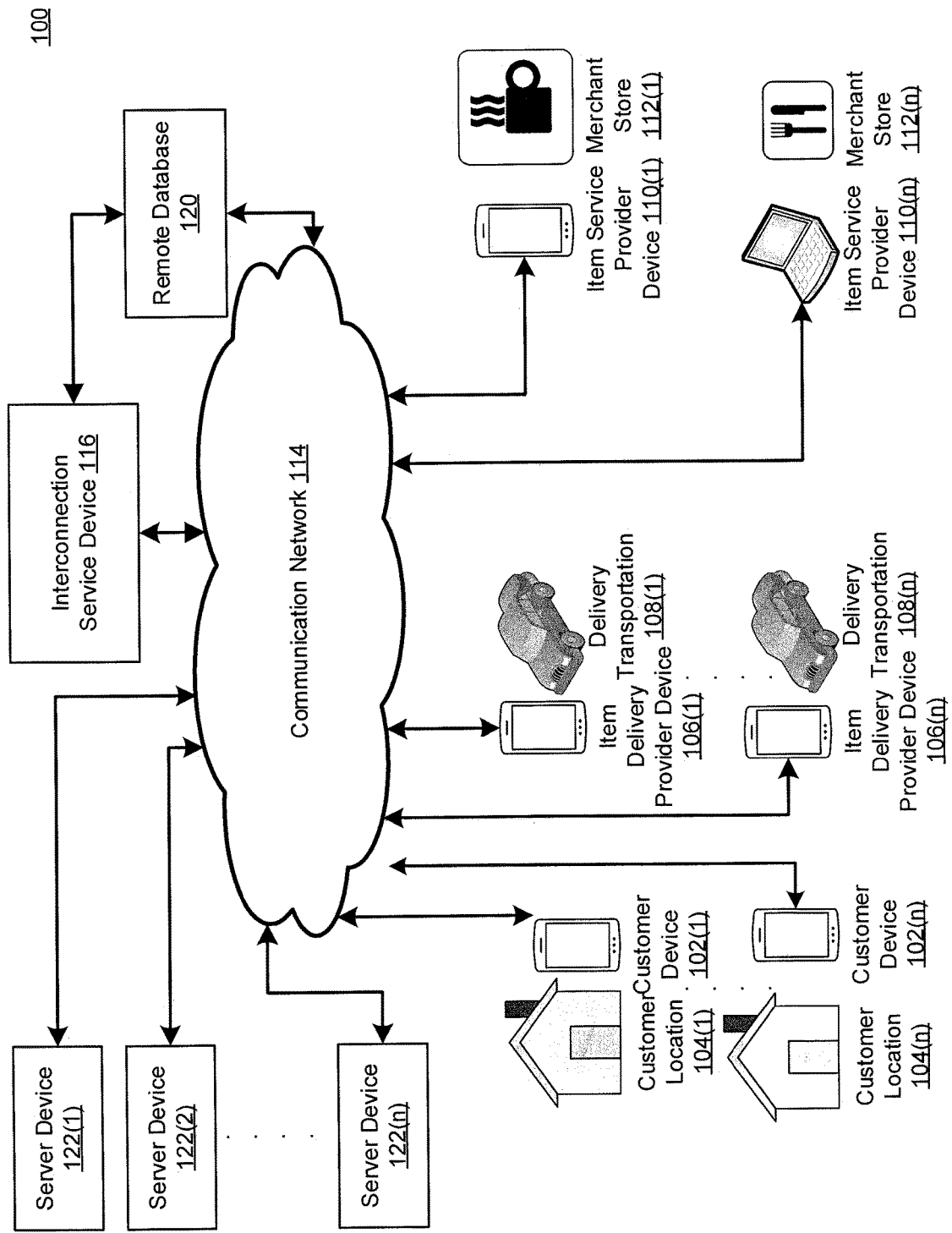
FIG. 1 is a block diagram of an exemplary system, consistent with disclosed embodiments.

FIG. 1 is a block diagram of an exemplary system 100, for performing one or more operations consistent with disclosed embodiments. In some embodiments, system 100 includes one or more customer devices 102(1), . . . 102(n) located at corresponding customer location 104(1), . . . 104(n) respectively, one or more item delivery provider devices 106(1), . . . 106(n) located in corresponding delivery transportations 108(1), . . . 108(n) respectively, one or more item service provider devices 110(1), . . . 110(n) located at corresponding merchant stores 112(1), . . . 112(n). Further, system 100 includes server devices 122(1), 122(2), . . . 122(n), an interconnection service device 116, a remote database 120 and a communication network 114. The system 100 may also include a plurality of interconnection service devices 116 (not shown in drawings) and a plurality of remote databases 120 (not shown in drawings) communicating with each other directly and further communicating with the customer devices 102(1)-102(n), item delivery provider devices 106(1)-106(n), item service provider devices 110(1)-110(n), server devices 122(1), 122(2), . . . 122(n), via the communication network 114. The components and arrangement of the components included in system 100 may vary. Thus, system 100 may include other components that perform or assist in the performance of one or more operations consistent with the disclosed embodiments.

As more fully described below, customer devices 102(1)-102(n), item delivery provider devices 106(1)-106(n), item service provider devices 110(1)-110(n), interconnection service device 116, server devices 122(1), 122(2), . . . 122(n), and remote database 120 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of customer device(s) 102(1)-102(n), item delivery provider device(s) 106(1)-106(n), item service provider devices 110(1)-110(n), server devices 122(1), 122(2), . . . 122(n), interconnection service device 116 and remote database 120 may be configured to communicate with one or more other components of system 100 via communication network 114, for example. In certain aspects, customers associated with the customer location 104(1)-104(n) are respectively associated with and operate customer devices 102(1)-102(n), drivers associated with the delivery transportations 108(1)-108(n) are respectively associated with and operate item delivery provider devices 106(1)-106(n), merchants associated with the merchant stores 112(1)-112(n) are respectively associated with and operate item service provider devices 110(1)-110(n), to interact with one or more components of system 100 by sending and receiving communications, initiating operations, and/or providing input for one or more operations consistent with the disclosed embodiments.

Interconnection service device 116 may be associated with an online ordering entity that receives, processes, manages, or otherwise offers ordering services for items. For example, the items that may be ordered via the online ordering entity may include prepared food, groceries, furniture, books, computers, and/or clothes, although any other type of items may also be ordered. For example, the interconnection service device 116 may receive order requests from customers using customer devices 102(1)-102(n) and process the received order request by transmitting the request to item service provider devices 110(1)-110(n) associated with merchant stores 112(1)-112(n) that would provide the ordered item. Interconnection service device 116 receives an order confirmation communication from item service provider devices 110(1)-110(n). Upon receiving the order confirmation from the item service provider devices 110(1)-110(n), interconnection service device 116 transmits a request to item delivery provider devices 106(1)-106(n) via server devices 122(1), 122(2), . . . 122(n), to collect the order from the merchant stores 112(1)-112(n) and deliver the order to customer location 104(1)-104(n). Item delivery provider devices 106(1)-106(n) accepts the requests and collects the requested item and delivers it to the customer location 104(1)-104(n).

Remote database 120 of system 100 may be communicatively coupled to integration service system 116 directly or via communication network 114. Further, the remote database 120 of system 100 may be communicatively coupled to customer devices 102(1)-102(n), item delivery provider devices 106(1)-106(n) and item service provider devices 110(1)-110(n), server devices 122(1), 122(2), . . . 122(n), via the communication network 114. Remote database 120 may include one or more memory devices that store information and are accessed and/or managed by one or more components of system 100. By way of example, remote database 120 may include Rabbit MQ, Oracle™ databases, Sybase™ databases, or other relational databases or nonrelational databases, such as Hadoop sequence files, HBase, or Cassandra. Remote database 120 may include computing components (e.g., database management system, database server, etc.) configured to receive and process requests for data stored in memory devices of remote database 120 and to provide data from remote database 120.

Remote database 120 is configured to store, among another things, merchant profile information for merchants associated with the item service provider devices 110(1)-110(n) located at the merchant stores 112(1)-112(n), customer profile information for customers associated with the customer devices 102(1)-102(n) located at the customer locations 104(1)-104(n) and driver profile information for the drivers associated with the item delivery provider devices 106(1)-106(n). Remote database 120, in some embodiments, stores data entries that include, for example, merchant profile information, customer profile information, and driver profile information.

The merchant stores 112(1)-112(n) may include a restaurant, coffee shop, bookstore, clothing stores, although any other type of stores can also be included. Further, merchant profile information includes merchant store name, store menu, list of items offered by the merchant, pictures of food, pictures of merchant store, categories of items, categories of food, merchants address, merchant store hours, and/or merchants phone number, although any other type of information associated with the merchant can also be included. The customer location 104(1)-104(n) may include a residential location, an office building, an apartment, although any other type of residence can also be included. Further, customer profile information in remote database 120 may include customer name, customers home address, pictures of customer, and/or customer phone number, although any other type of information associated with the merchant can also be included. The delivery transportation 108(1)-108(n) may include a car, bike, truck, bus, although any other type of delivery transportation can also be included. Further, driver profile information includes drivers name, drivers home address, pictures of driver, and/or drivers phone number, make and model of a delivery transportation the driver drives, although any other type of information associated with the driver can also be included.

In one aspect, interconnection service device 116 may include one or more computing devices, configured to perform one or more operations consistent with disclosed embodiments as described more fully below in relation to FIGS. 4A-4E. In one aspect, interconnection service device 116 may include one or more servers or server systems. Interconnection service device 116 may include one or more processors configured to execute software instructions stored in a memory or other storage device. The one or more processors may be configured to execute the stored software instructions to perform internet-related communication, online order-based processes, and receiving and propagating efficient search updates in real time. The one or more computing devices of interconnection service device 116 may be configured to modify and store customer profile information, merchant profile information and/or driver profile information. The one or more computing devices of interconnection service device 116 may also be configured to communicate with other components of system 100 to receive and propagate efficient search updates in real time. In some embodiments, interconnection service device 116 may provide one or more mobile applications, web-sites or online portals that are accessible by customer devices 102(1)-102(n), item delivery provider devices 106(1)-106(n), item service provider device 110(1)-110(n), server devices 122(1), 122(2), . . . 122(n), over communication network 114. The disclosed embodiments are not limited to any particular configuration of interconnection service device 116.

Server devices 122(1), 122(2), . . . 122(n), may be associated with servicing online ordering requests. Servicing online ordering requests may include receives, processes, manages, or otherwise offers ordering services for products or services. For example, the products or services that may be ordered via the online ordering entity may include, prepared food, groceries, furniture, books, computers, and/or clothes, although any other type of items may also be ordered. For example, the server devices 122(1), 122(2), . . . 122(n), may receive order requests from customers using customer devices 102(1)-102(n) and process the received order request by transmitting responses to item service provider devices 110(1)-110(n) associated with merchant stores 112(1)-112(n) that would provide the ordered item. In another example, the server devices 122(1), 122(2), . . . 122(n), receive from item delivery provider devices 106(1)-106(n) associated with delivery transportation 108(1)-108(n) and transmit responses for order requests to customers using customer devices 102(1)-102(n). In another example, the server devices 122(1), 122(2), . . . 122(n), receive from item service provider devices 110(1)-110(n) associated with merchant stores 112(1)-112(n) and transmit responses for order requests to customers using customer devices 102(1)-102(n).

Communication network 114 may comprise any type of computer networking arrangement configured to provide communications or exchange data, or both, between components of system 100. For example, communication network 114 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Communication network 114 may also include a public switched telephone network ("PSTN") and/or a wireless cellular network. Communication network 114 may be a secured network or unsecured network. In some embodiments, one or more components of system 100 may communicate directly through a dedicated communication link(s).

Customer devices 102(1)-102(n), item delivery provider devices 106(1)-106(n), item service provider devices 110(1)-110(n), server devices 122(1), 122(2), . . . 122(n), may be one or more computing devices configured to perform one or more operations consistent with the disclosed embodiments, as described more fully below in relation to FIGS. 2A, 2B and 3. Customer devices 102(1)-102(n), item delivery provider devices 106(1)-106(n), item service provider devices 110(1)-110(n) may execute browser or related mobile display software that displays an online portal for placing online orders for delivery of items, receiving orders and delivering items that are ordered, on a display included in, or connected to, customer devices 102(1)-102(n). Customer devices 102(1)-102(n) may also store and execute other mobile applications that allow customers, merchants, and/or drivers to interact with an online portal provided by the interconnection service device 116.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2A:
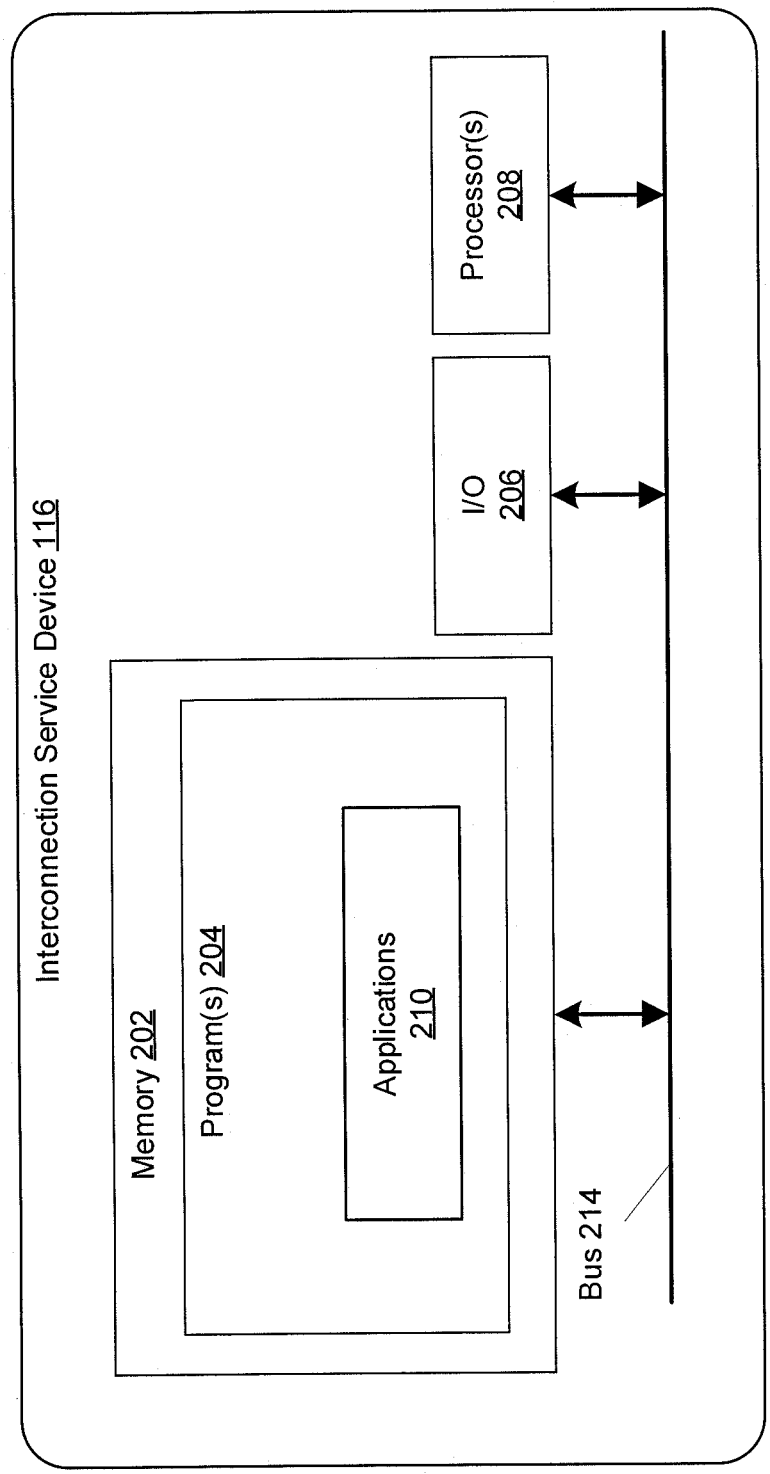
FIG. 2A is a block diagram of an exemplary interconnection service device, consistent with disclosed embodiments.

FIG. 2A shows an exemplary interconnection service device 116 consistent with the disclosed embodiments. Variations of exemplary interconnection service device 116 may constitute one or more components of interconnection service device 116. In one embodiment, interconnection service device 116 includes one or more memories 202, one or more I/O devices 206, and one or more processors 208. In some embodiments, interconnection service device 116 may be a part of interconnection service device 116. In some embodiments, interconnection service device 116 may take the form of a specially programmed server or computing system used by interconnection service device 116 to perform complete functions of interconnection service device 116. In some embodiments, interconnection service device 116 may be configured as an apparatus, embedded system, dedicated circuit, or the like based on the storage, execution, and/or implementation of software instructions that perform one or more operations consistent with the disclosed embodiments.

Memory 202 may include one or more storage devices configured to store instructions used by processor 208 to perform functions related to disclosed embodiments. For example, memory 202 may be configured with one or more software instructions, such as program(s) 204 that may perform one or more operations when executed by processor 208. The disclosed embodiments are not limited to separate programs or computers configured to perform dedicated tasks. For example, memory 202 may include a single program 204 that performs the functions of server device 200, or program 204 may comprise multiple programs. In certain embodiments, memory 202 may store sets of instructions or programs 204 for performing functions of interconnection service device 116. These sets of instructions may be executed by processor 208 to perform communication and/or processes consistent with disclosed embodiments.

In certain embodiments, when interconnection service device 116 constitutes one or more of the components of interconnection service device 116, memory 202 includes programs 204, the programs 204 include applications 210. By way of example, the applications 210 may include a decision rules table or a classification lookup table, as described in detail below. In other embodiments, each of a decision rules table and classification lookup table may be implemented as separate servers. In another embodiment, each of decision rules table and classification lookup table may be hosted on the remote database 120.

Input/output (I/O) 206 may include various input/output devices, such as a keyboard, a mouse-type device, a gesture sensor, an action sensor, a physical button, switch, microphone, touchscreen panel, stylus, etc., that may be manipulated by customer devices 102(1)-102(n), item delivery provider device 106(1) and/or item service provider device 110(1)-110(n). I/O devices 206 may also include an audio output device. Exemplary communication modules of I/O devices 206 may include, for example, a short-range or near field wireless communication modem, a Wi-Fi™ communication modem, or a cellular communication modem. I/O devices 206 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in interconnection service device 116 to exchange information with customer devices 102(1)-102(n) item delivery provider device 106(1), item service provider device 110(1)-110(n), server devices 122(1), 122(2), ... 122(n), or remote database 120 via communication network 114.

Processor 208 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Figure 2B:
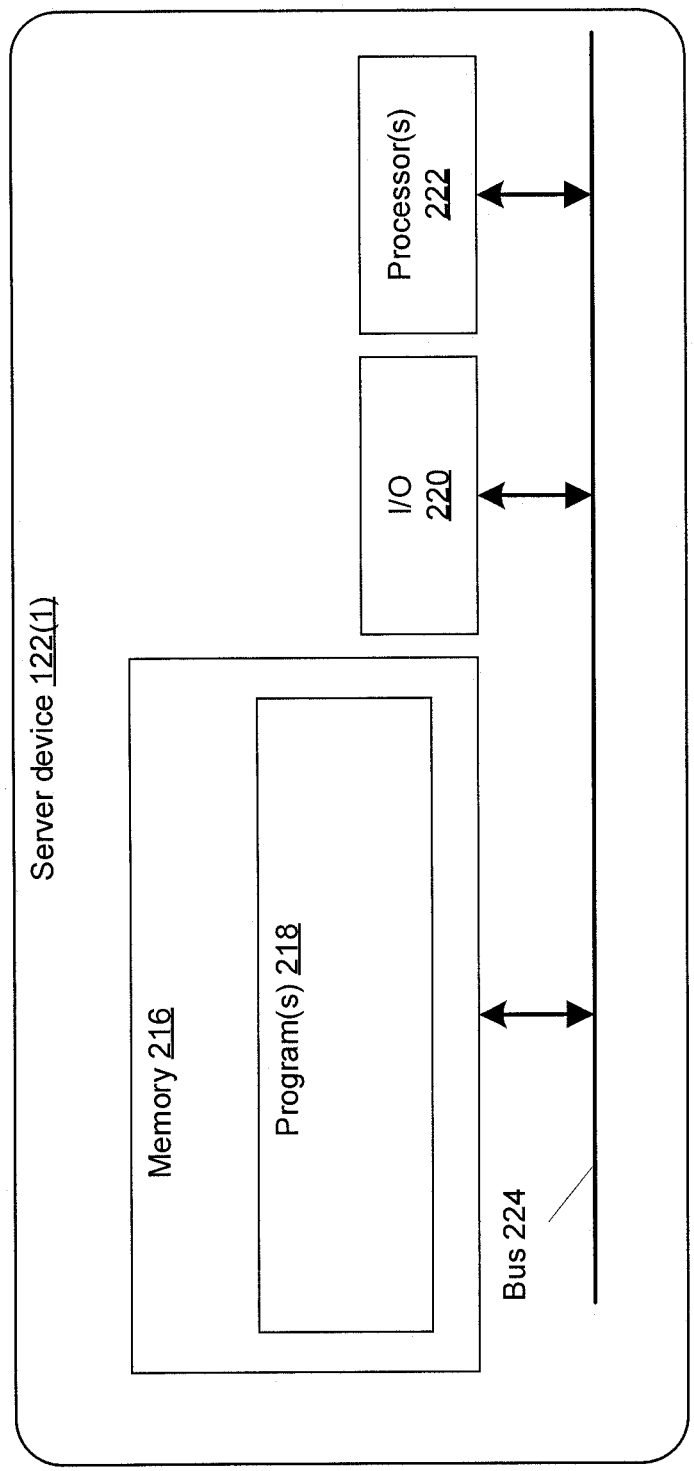
FIG. 2B is a block diagram of an exemplary server device, consistent with disclosed embodiments.

FIG. 2B shows an exemplary server device 122(1) consistent with the disclosed embodiments. Configuration of server devices 122(2) ... 122(n) are similar to server device 122(1). Variations of exemplary server device 122(1) may constitute one or more components of interconnection service device 116. In one embodiment, server device 122(1) includes one or more memories 216, one or more I/O devices 220, and one or more processors 222. In some embodiments, server device 122(1) may be a part of interconnection service device 116. In some embodiments, server device 122(1) may take the form of a specially programmed server or computing system used by server device 122(1) to perform complete functions of server device 122(1). In some embodiments, server device 122(1) may be configured as an apparatus, embedded system, dedicated circuit, or the like based on the storage, execution, and/or implementation of software instructions that perform one or more operations consistent with the disclosed embodiments.

Memory 216 may include one or more storage devices configured to store instructions used by processor 222 to perform functions related to disclosed embodiments. For example, memory 216 may be configured with one or more software instructions, such as program(s) 218 that may perform one or more operations when executed by processor 222. The disclosed embodiments are not limited to separate programs or computers configured to perform dedicated tasks. For example, memory 216 may include a single program 218 that performs the functions of server device 122(1), or program 218 may comprise multiple programs. In certain embodiments, memory 216 may store sets of instructions or programs 218 for performing functions of server device 122(1). These sets of instructions may be executed by processor 208 to perform communication and/or processes consistent with disclosed embodiments.

In certain embodiments, when server device 122(1) constitutes one or more of the components of interconnection service device 116, application 210 includes a decision rules table and classification lookup table, as described in detail below.

Input/output (I/O) 220 may include various input/output devices, such as a keyboard, a mouse-type device, a gesture sensor, an action sensor, a physical button, switch, microphone, touchscreen panel, stylus, etc., that may be manipulated by customer devices 102(1)-102(n), item delivery provider device 106(1) and/or item service provider device 110(1)-110(n). I/O devices 220 may also include an audio output device. Exemplary communication modules of I/O devices 220 may include, for example, a short-range or near field wireless communication modem, a Wi-Fi™ communication modem, or a cellular communication modem. I/O devices 220 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server device 122(1) to exchange information with interconnection service device 116, customer devices 102(1)-102(n) item delivery provider device 106(1), item service provider device 110(1)-110(n), server devices 112(2)-112(n), or remote database 120 via communication network 114.

Processor 218 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Figure 3:
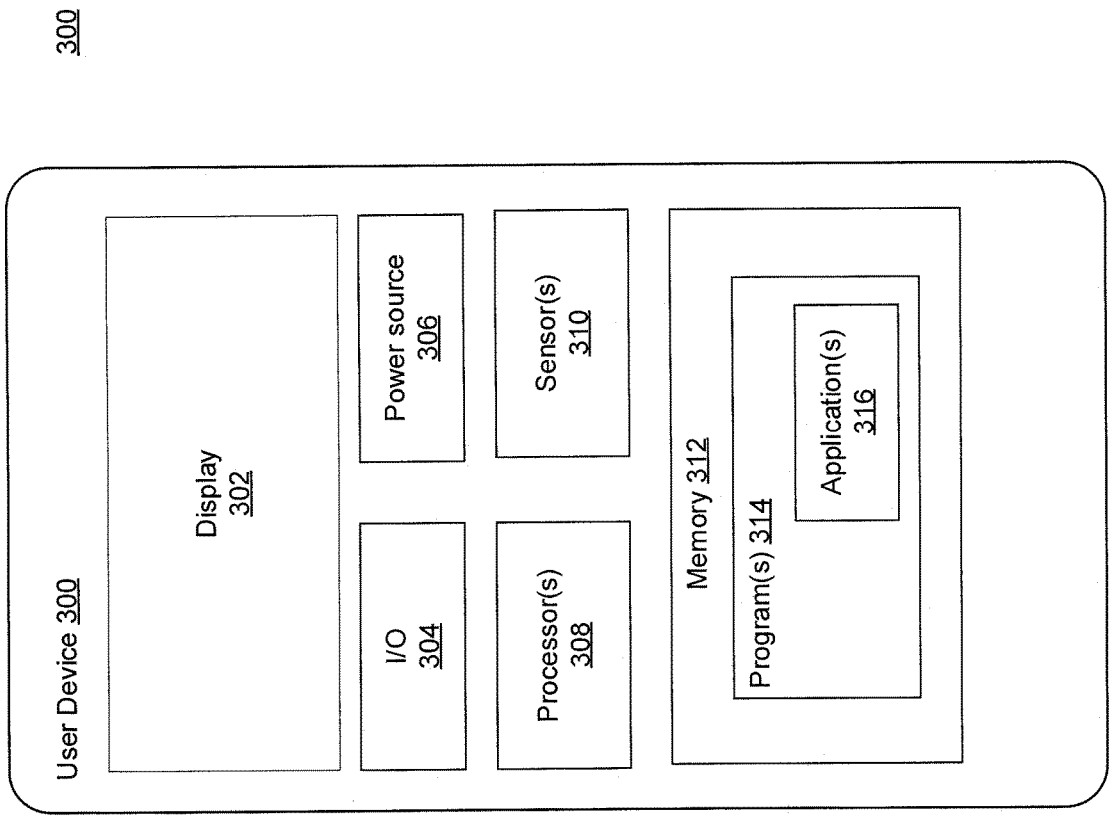
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of each of the customer devices 102(1)-102(n), the item delivery provider devices 106(1)-106(n) and item service provider devices 110(1)-110(n).

User device 300 may enable associated customers, drivers and merchants associated with customer devices 102(1)-102(n), the item delivery provider devices 106(1)-106(n) and item service provider devices 110(1)-110(n), respectively to, for example, perform remote interactions or mobile transactions with interconnection service device 116, or receive information from interconnection service device 116. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any combination of these computers and/or affiliated components.

User device 300 includes one or more processors 308 configured to execute software instructions stored in memory, such as a memory 312. Memory 312 may store one or more software programs 314 that when executed by processor 308 perform known Internet-related communication, content display processes, and other interactive processes for customers, drivers and/or merchants. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with interconnection service device 116 and other components via communication network 114, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 114, such as Web browser software, tablet or smart handheld device networking software, etc.

Display device 302 may include, for example, a liquid crystal displays (LCD), a light emitting diode screens (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers, drivers and merchants or another device. For example, I/O devices 304 may include various input/output devices, such as a keyboard, a mouse-type device, a gesture sensor, an action sensor, a physical button, switch, microphone, touchscreen panel, stylus, etc., that may be manipulated by customers, drivers and merchants to input information using user device 300. I/O devices 304 may also include an audio output device, such as a speaker configured to provide sound and audio feedback to customers, drivers and merchants operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers, drivers and merchants. I/O devices 304 may also include one or more communication modules (not shown) for sending and receiving information from other components in system 100 by, for example, establishing wired or wireless connectivity between user device 300 and communication network 114. I/O devices 304 may include radio frequency, infrared, or other near-field communication interfaces, for communicating with other devices associated with communication network 114. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with interconnection service device 116 or remote database 120 via communication network 114.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with interconnection service device 116 via communication network 114 and perform aspects of the disclosed methods. For example, user device 300 may connect to interconnection service device 116 by using browser software to access and receive information or perform other operations associated with an internet service provider.

According to an exemplary embodiment, software applications 316 associated with interconnection service device 116 may be installed on user device 300, as shown in FIG. 3. For example, interconnection service device 116 may receive a request from customer device 102(1) to download one or more software applications 316 to user customer device 102(1). In one embodiment, interconnection service device 116 may receive the request from a customer associated with customer device 102(1), using a web browser application installed on customer device 102(1) respectively. In another embodiment, interconnection service device 116 may receive the request to download one or more software applications 316 associated with interconnection service device 116 onto customer device 102(1) from a webpage or another portal associated with interconnection service device 116 accessed via, e.g., customer device 102(1). In this embodiment, interconnection service device 116 may store software instructions corresponding to one or more software applications 316 in remote database 120. For responding to the download request, interconnection service device 116 may receive additional information from customer device 102(1) regarding the particular device specifications of customer device 102(1) to enable customer device 102(1) to download software instructions corresponding to the particular specifications. Alternatively, interconnection service device 116 may push a download request link to customer device 102(1) or transmit software code corresponding to one or more software applications 316 directly to customer device 102(1) in, for example, an e-mail, a text or short message service (SMS) message, a prompt through an app, or other suitable method. Customer device 102(1) may receive the software code related to one or more software applications 316, such as via communication network 114, to download and install the software code. Similarly, in another example, interconnection service device 116 may receive a request from a deriver associated with item delivery provider device 106(1) to download one or more software applications 316 onto the item delivery provider device 106(1). Further, similarly, in another example, interconnection service device 116 may receive a request from a merchant associated with item service provider device 110(1) to download one or more software applications 316 onto the item service provider device 110(1).

FIGS. 4A-4E contain a flowchart of an exemplary process 400 implemented by interconnection service device 116 for interconnecting network devices based on queuing and servicing responses, consistent with the disclosed embodiments. Interconnection service device 116 is implemented to execute software instructions that perform one or more of the operations of process 400. Operations of process 400 are explained in association with FIGS. 4A-4E.

In accordance with process 400, in step 402, interconnection service device 116 receives an order request for a product or service associated with a second computer system upon payment approval from first computer system. The first computer system may be customer devices 102(1)-102(n) and the second computer system may be item service provider devices 110(1)-110(n). By way of example, with reference to FIG. 4A, a customer associated with the customer device 102(1) initiates application 316 to access an online ordering portal to order food from merchant stores 112(1)-112(n). In this example, the customer makes his/her selection of food using the online ordering portal and then makes a payment for the selected food. Upon successful authorization of the payment, a request to order food from merchant store 112(1) is generated and transmitted to interconnection service device 116. Interconnection service device 116 upon receiving the order request, determines that the request from the customer device 102(1) is requesting the food from merchant store 112(1), and determines that the order request is to be transmitted to the item service provider device 110(1) associated with merchant store 112(1). The order request may include, name of the customer, name of the restaurant or merchant stores 112(1)-112(n), names of food dishes requested, price of the food dishes and time the order was placed.

In another example, interconnection service device 116 may receive the order request from customer device 102(1) via server device 112(1). In this scenario, customer device 102(1) may transmit the order request to server device 122(1) and server device 122(1) may transmit the order request to interconnection service device 116.

In step 404, interconnection service device 116 instantiates an order messaging queue associated with the order request. Upon receiving the order request from the customer device 102(1), interconnection service device 116 accesses an order messaging queue storage at remote database 120 and creates an order messaging queue. Upon creating the order messaging queue, interconnection service device 116 adds an identifier associated with customer device 102(1) in the order messaging queue.

By way of example, in this embodiment, the interconnection service device 116 may communicate with remote database 120 by utilizing Streaming Text Oriented Messaging Protocol (STOMP), although any other type of communication protocol may also be utilized. In other embodiments, interconnection service device 116 may create and store an order messaging queue locally in memory 202 of the interconnection service device 116.

The order messaging queue is a data queue utilized to add identifiers associated with network devices that participate in processing of online order request. In this example, the network devices include customer devices 102(1)-102(n), item service provider devices 110(1)-110(n), and/or item delivery provider devices 106(1)-106(n), and may be added into the order messaging queue, as explained in detail below. Further, order messaging queue stores a lookup table that includes each of the server devices 122(1)-122(n) associated with the at least one of an identifier corresponding to the customer devices 102(1)-102(n), item service provider devices 110(1)-110(n), and/or item delivery provider devices 106(1)-106(n). Lookup table provides for each of the customer devices 102(1)-102(n), item service provider devices 110(1)-110(n), and/or item delivery provider devices 106(1)-106(n) a corresponding one or more server devices 122(1)-122(n) that would service order requests corresponding to the customer devices 102(1)-102(n), item service provider devices 110(1)-110(n), and/or item delivery provider devices 106(1)-106(n). Interconnection service device 116 may access the order messaging queue to determine the identifier stored in the order messaging queue, and then access the lookup table to identify which one of the server devices 122(1)-122(n) are assigned to that identifier to service the device corresponding to that identifier.

The lookup table may be previously stored on remote database 120 by a system administrator. In other embodiments, the lookup table may be automatically created by interconnection service device 116, upon receiving an order request. Interconnection service device 116, may create the lookup table based on network traffic load associated with each of server devices 122(1)-122(n), in order to balance the network traffic load. In another embodiment, the lookup table may be updated periodically by interconnection service device 116 to provide network traffic load balancing. This update may be performed periodically at regular time intervals. Time intervals may include 1 second, 30 second, 1 minute or 1 hour, although any other time period may also be included.

In step 406, interconnection service device 116 forwards a confirmation request comprising the order request to the second computer system. In this example, interconnection service device 116 forwards or transmits a confirmation request to the item service provider device 110(1), requesting the item service provider device 110(1) to either accept or deny preparing of the requested items in the order request.

In step 408, interconnection service device 116 receives a confirmation request response from the second computer system. In this example, interconnection service device 116 receives a response to the confirmation request from the item service provider device 110(1).

In step 410, interconnection service device 116, determines if the response received from item service provider device 110(1) includes a "Merchant Accept" message identifier. If the received response does not include a "Merchant Accept" message identifier, then the interconnection service device 116 determines that the item service provider device 110(1) has declined to prepare the requested items in the order request. The method takes the No branch and moves to step 412.

In step 412, the interconnection service device 116 transmits a cancel order notification to the customer device 102(1) and further issues a refund for the amount of payment made for the order request and the method ends here.

Back in step 408, if the received response includes a "Merchant Accept" message identifier, then the interconnection service device 116 determines that the item service provider device 110(1) has accepted to prepare the requested items in the order request, and the method takes the Yes branch and the method flow moves to step 416.

In step 416, interconnection service device 116, adds an identifier associated with second computer system to the order messaging queue. In this example, interconnection service device 116 determines an identifier of the item service provider device 110(1) from the response received in step 408. The received response may include an internet protocol packet that includes an identifier. An identifier may include username associated with the merchant corresponding to the item service provider device 110(1), internet protocol (IP) address of the item service provider device 110(1), Media access control (MAC) address of the item service provider device 110(1), International Mobile Equipment Identity (IMEI) item service provider 110(1), although any other type of identifier associated with a network device may also be included. The interconnection service device 116 determines the identifier and adds it into the order messaging queue and the method moves to step 418.

In step 418, interconnection service device 116 forwards a second confirmation request associated with a plurality of tasks to a plurality of third computer systems. In this example, the plurality of third computer systems may be item delivery provider devices 106(1)-106(n). The interconnection service device 116 forwards or transmits the second confirmation request to the item delivery provider devices 106(1)-106(n), requesting the item delivery provider devices 106(1)-106(n) to either accept or deny pickup of the requested item from the merchant stores 112(1)-112(n) and delivery the requested item to customer devices 102(1)-102(n) at customer locations 104(1)-104(n).

In step 420, interconnection service device 116 receives a response from one of the plurality of item delivery provider devices 106(1)-106(n).

In step 422 (FIG. 4B), interconnection service device 116 determines if the response received from one of the pluralities of item delivery provider devices 106(1)-106(n) includes a "Delivery Accept" message identifier. If the received response does not include a "Delivery Accept" message identifier, then the interconnection service device 116 determines that the one of the plurality of item delivery provider devices 106(1)-106(n) has declined to pick up and deliver the requested items in the order request. The method takes the No branch and moves to step 426.

In step 424, the interconnection service device 116 determines if a response to the second confirmation request is received from another one of the plurality of item delivery provider devices 106(1)-106(n). If the interconnection service device 116 determines that no response is received to the second confirmation request from another one of the pluralities of item delivery provider devices 106(1)-106(n), then the method proceeds to step 426.

In step 426, the interconnection service device 116, transmits a cancel order notification to the customer device 102(1) and further issues a refund for the amount of payment made for the order request and the method ends here.

Back in step 424, if the interconnection service device 116 determines that a response is received to the second confirmation request from another one of the pluralities of item delivery provider devices 106(1)-106(n), then the method loops back to step 422.

Back in step 422, if the received response includes a "Delivery Accept" message identifier, then the interconnection service device 116 that the one of the plurality of item delivery provider devices 106(1)-106(n) has accepted to pick up and deliver the requested items in the order request. The method takes the Yes branch and moves to step 428.

In step 428, interconnection service device 116, instantiates a first task associated with preparation of product or service and generates a food task interface. Interconnection service device 116 establishes a first connection link with the second computer system over a network protocol and instantiates a first task. For example, interconnection service device 116 establishes a first open transmission control protocol (TCP) connection link with the second computer system over a WebSocket protocol and instantiates a first task, although any other type of network protocol may also be used. The second computer system in this example is item service provider device 110(1) as explained above in step 410. Upon instantiating the first task, the first task causes the interconnection service device 116 to monitor communications received from item service provider device 110(1) over the first open TCP connection link, and based on the updates of the status of the order request, interconnection service device 116 updates the food task interface to display a real time status of the order request. Food task interface may be displayed on customer devices 102(1)-102(n), item delivery provider devices 106(1)-106(n), and/or item service provider devices 110(1)-110(n), associated with the order request.

In step 430, interconnection service device 116, instantiates a second task associated with delivery of product or service and generates a delivery task interface, interconnection service device 116, upon determining that one of the plurality of item delivery provider devices 106(1)-106(n) has accepted to pickup and delivery the requested items in the order request, the interconnection service device 116 establishes a second connection link with the one of the plurality of item delivery provider devices 106(1)-106(n) over a network protocol and instantiates a second task. For example, interconnection service device 116 establishes a second open transmission control protocol (TCP) connection link with the one of the plurality of item delivery provider devices 106(1)-106(n) over a WebSocket protocol and instantiates a second task, although any other type of network protocol may also be used. Upon instantiating the second task, the second task causes the interconnection service device 116 to monitor communications received from one of the plurality of item delivery provider devices 106(1)-106(n) over the second open TCP connection link, and based on the updates of the status of the order request, interconnection service device 116 updates the delivery task interface to display a real time status of the order request. Food task interface may be displayed on customer devices 102(1)-102(n), item delivery provider devices 106(1)-106(n), and/or item service provider devices 110(1)-110(n), associated with the order request.

In step 432, interconnection service device 116, adds an identifier associated with one of the third computer systems to the order messaging queue. In this example, interconnection service device 116 determines an identifier of the item delivery provider device 106(1) from the response received in step 422 or step 424. The received response may include an Internet Protocol packet that includes an identifier. An identifier may include username associated with the merchant corresponding to the item delivery provider device 106(1), internet protocol (IP) address of the item delivery provider device 106(1), Media access control (MAC) address of the item delivery provider device 106(1), International Mobile Equipment Identity (IMEI) associated with item delivery provider device 106(1), although any other type of identifier associated with a network device may also be included. The interconnection service device 116 determines the identifier and adds it into the order messaging queue and the method moves to step 434.

In step 434, interconnection service device 116, receive a communication from one of the first, second, or third computer systems. Received communication may include messages from item services provider devices 110(1)-110(n), messages from item delivery provider devices 106(1)-106(n), messages from customer devices 102(1)-102(n), or messages from any other network devices may also be included.

Messages from item services provider devices 110(1)-110(n), may include message identifiers and device identifiers. Message identifiers may include "Merchant Ready", "Merchant Delay", "Merchant Cancel", or any other message identifier may also be included. Further, "Merchant Ready" identifier provides an indication to interconnection service device 116 that the item requested in the request order is ready to be picked up by a delivery personnel. "Merchant Delay" identifier provides an indication to interconnection service device 116 that the item requested in the request order has been delayed to pick up by a delivery personnel, further the message also includes a new time, when the item requested in the request order will be available to pick up. "Merchant Cancel" identifier provides an indication to interconnection service device 116 that the merchant store has canceled the request order and would not service the request order.

Messages from item delivery provider devices 106(1)-106(n), may include message identifiers. Message identifiers may include "Pick up complete", "Delivery complete", "Delivery Cancel", or any other message identifier may also be included. Further, "Pick up complete" identifier provides an indication to interconnection service device 116 that the item requested in the request order has been picked up by a delivery personnel associated with item delivery provider device 106(1). "Delivery complete" identifier provides an indication to interconnection service device 116 that the item requested in the request order has been delivered by the delivery personnel, further the message also includes a time when the item requested in the request order has been delivered. "Delivery Cancel" identifier provides an indication to interconnection service device 116 that the delivery personnel associated with item delivery provider device 106(1) has canceled the request order and would not service the request order.

Messages from customer devices 102(1)-102(n) may include message identifiers. Message identifiers may include a "Partially Cancel", "Complete Cancel", or any other message identifier may also be included. Further, "Partially Cancel" identifier provides an indication that, by way of example, customer device 102(1) would request a refund of an earlier requested order. Further, message identifier "Complete Cancel" provides an indication that, by way of example, customer device 102(1) has requested to cancel a pending order request that has not been complete serviced.

The devices identifiers received in communication may include device identifiers associated with customer devices 102(1)-102(n), item delivery provider devices 106(1)-106(n), and item service provider devices 110(1)-110(n). The device identifiers may include username, internet protocol (IP) address, Media access control (MAC) address, International Mobile Equipment Identity (IMEI) associated with customer devices 102(1)-102(n), item delivery provider devices 106(1)-106(n), and item service provider devices 110(1)-110(n), although any other type of identifier associated with a network device may also be included.

In step 436, interconnection service device 116, classifies the received communication based on determining the type of contents received in the communication in step 434. Interconnection service device 116 accesses a classification lookup table stored at the remote database 120 to classify the received communication into a request classified to be coming from a second computer system, or classify the received communication into a request classified to be coming from a third computer system, or classify the received communication into a request classified to be coming from a first computer system.

The classification lookup table stores association between a received message identifier and associated a first computer system, second computer system or third computer system. By way of example, the lookup table associates the message identifiers of "Merchant Ready", "Merchant Delay", "Merchant Cancel", to be corresponding with item service provider devices 110(1)-110(n). Further, the lookup table associates the message identifiers of include "Pick up complete", "Delivery complete", "Delivery Cancel", to be corresponding with item delivery provider devices 106(1)-106(n). Additionally, the lookup table associates the message identifiers of include "Partially Cancel", "Complete Cancel", to be corresponding with customer devices 102(1)-102(n). Accordingly, interconnection service device 116, classifies the received communication to coming from either item service provider devices 110(1)-110(n), item delivery provider devices 106(n), or customer devices 102(1)-102(n).

Figure 4A:
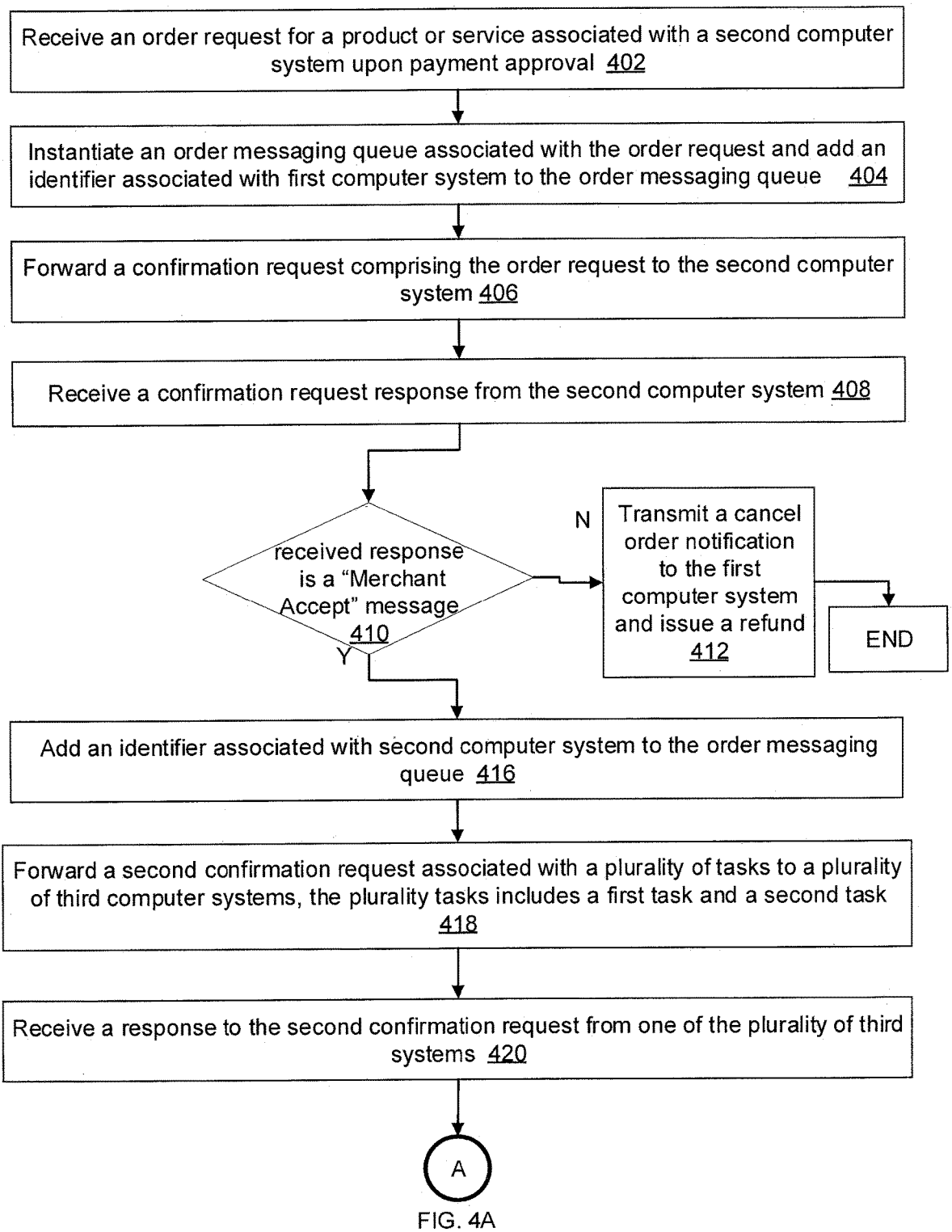
FIGS. 4A-4E contains a detailed flowchart of an exemplary process of interconnecting network devices based on queuing and servicing responses, consistent with disclosed embodiments.
Figure 4B:
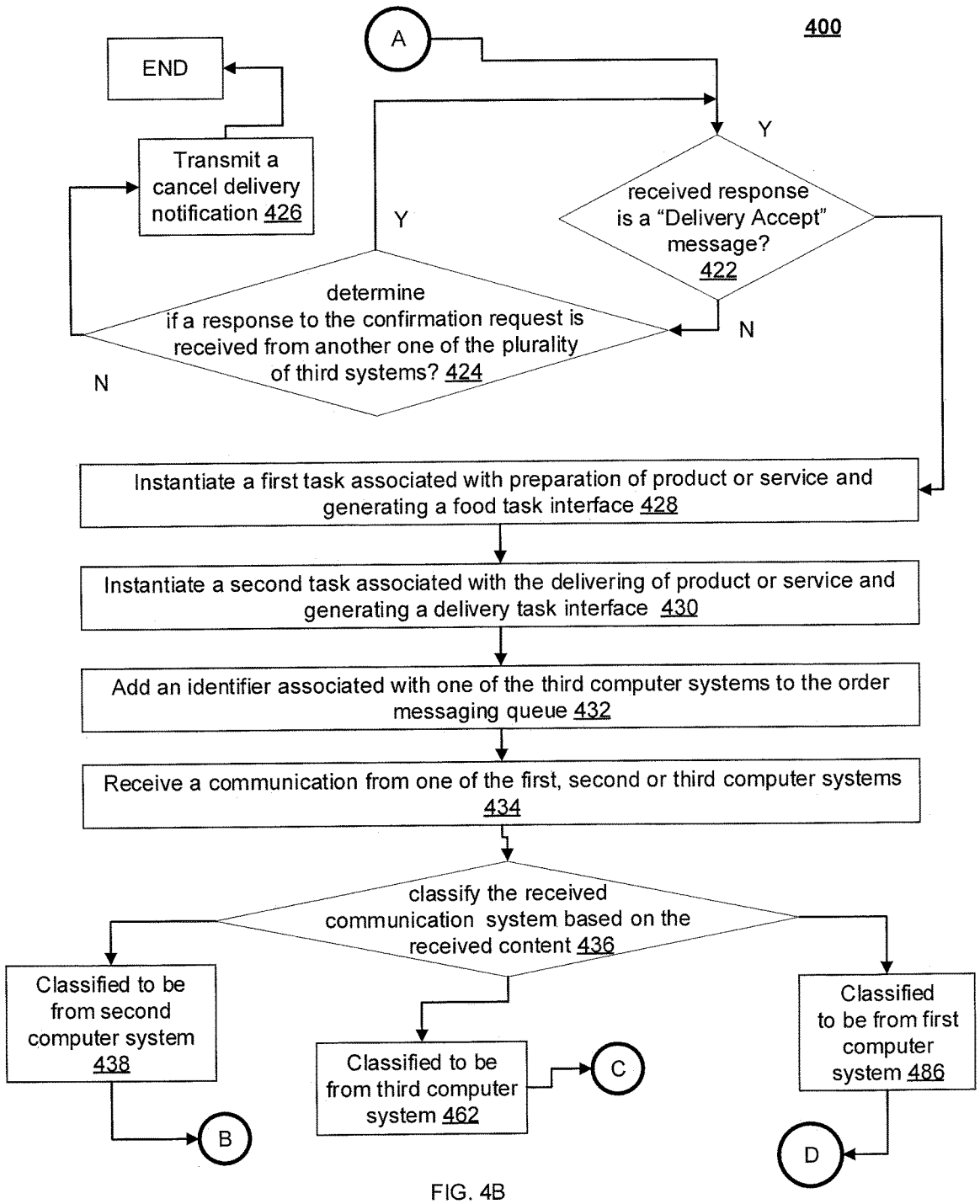
Figure 4C:
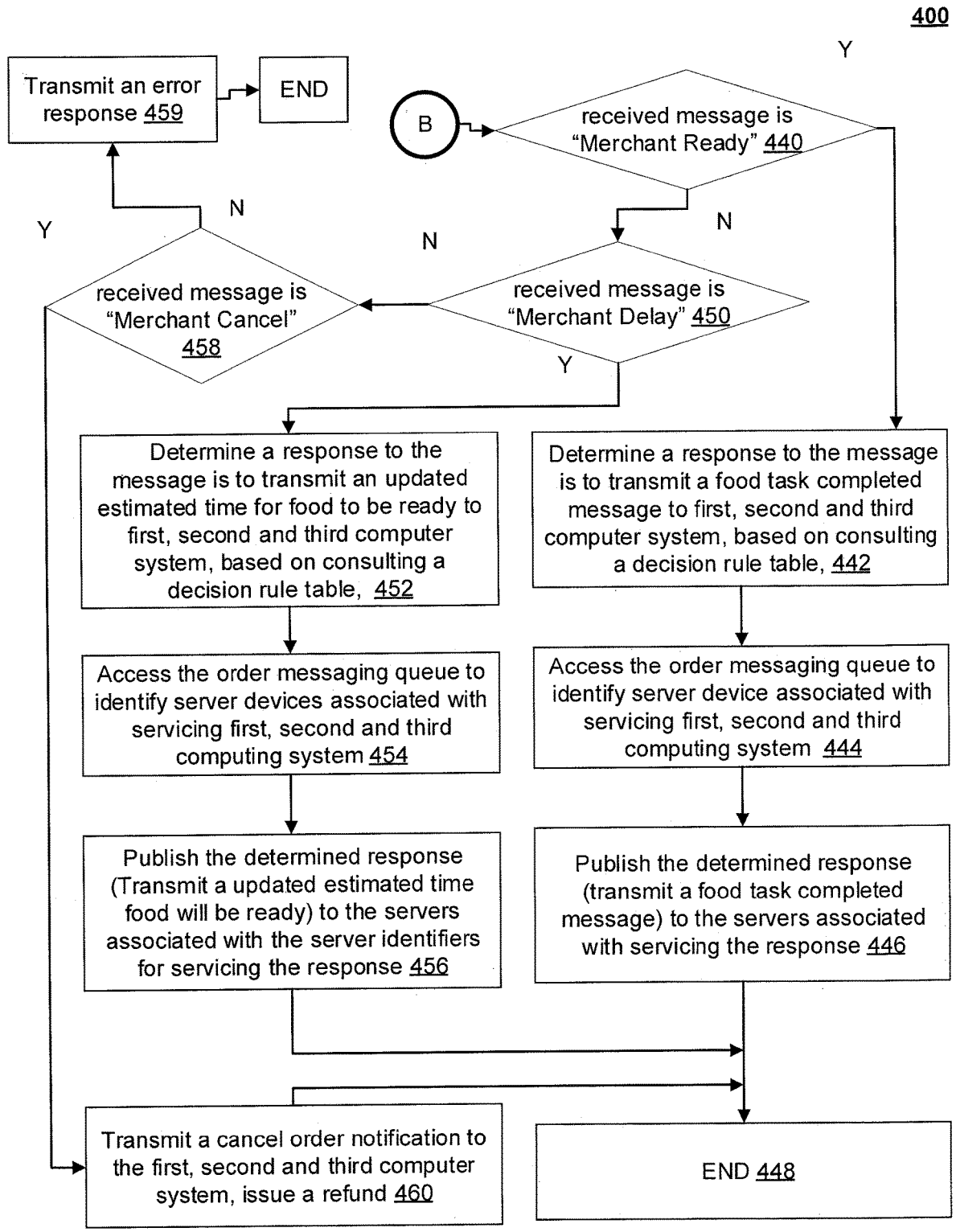

When in step 436 (FIG. 4B), interconnection service device 116, determines that the received communication is from one of the item service provider devices 110(1)-110(n), then the interconnection service device 116, proceeds to step 438 to follow step 440 (FIG. 4C).

In step 440, interconnection service device 116, determines if the received message identifier in the received communication is "Merchant Ready". If interconnection service device 116 determines that the received communication includes a "Merchant ready" identifier, then the method proceeds to take the yes branch to step 442.

In step 442, interconnection service device 116, consults a decision rule table to determine a response to the received communication based on the "Merchant Ready" identifier.

The decision rule table is a table stored in the remote database 120. The decision rule table includes rules for providing a response based on the received identifier in the message. By way of example, a rule may be, for a "Merchant Ready" identifier, interconnection service device 116 is programmed to transmit a food task completed message to customer devices 102(1)-102(n), item delivery provider devices 106(1)-106(n), and item service provider devices 110(1)-110(n), As food task complete message causes to update food task interface that was generated on customer devices 102(1)-102(n), item delivery provider devices 106(1)-106(n), and item service provider devices 110(1)-110(n), to display a message such as "Food is ready to be picked up".

Another rule may be, for a "Merchant Delay" identifier, interconnection service device 116 is programmed to transmit a response for estimated time for food to be ready to customer devices 102(1)-102(n), item delivery provider devices 106(1)-106(n), and item service provider devices 110(1)-110(n). Upon receiving this response food task interface that was generated on customer devices 102(1)-102(n), item delivery provider devices 106(1)-106(n), and item service provider devices 110(1)-110(n), is updated to display a new time for when the food would be ready.

In this step 442, based on consulting decision rule table, interconnection service device 116 determines a response to message identifier "Merchant Ready", is to transmit a food task complete message to, by way of example, to customer device 102(1), item delivery provider device 106(1), and item service provider device 110(1) and the method proceeds to step 444.

In step 444, interconnection service device 116 accesses order messaging queue to identify server devices 122(1)-122(n) associated with, in this example, customer device 102(1), item delivery provider device 106(1), and item service provider device 110(1) to transmit the response determined in step 442. Interconnection service device 116 accesses the order messaging queue to identify identifiers associated with customer device 102(1), item delivery provider device 106(1), and item service provider device 110(1) to and further identifies corresponding server devices 122(1)-122(n) associated with servicing customer device 102(1), item delivery provider device 106(1), and item service provider device 110(1). In this example, interconnection service device 116, identifies server device 122(1) to be associated with servicing customer 102(1), server device 122(2) to be associated with servicing item delivery provider device 106(1), and server device 122(3) to be associated with servicing item service provider device 110(1).

In step 446, interconnection service device 116 publishes the determined response to the server devices 122(1)-122(n) associated with servicing the response. By way of example, interconnection service device 116 publishes or transmits the determined response of transmit a food task complete message to server device 122(1) associated with servicing customer 102(1), server device 122(2) associated with servicing item delivery provider device 106(1), and server device 122(3) associated with servicing item service provider device 110(1). Upon publishing the determined responses, the server devices 122(1), 122(2), and 122(n) updates food task interface and delivery task interface associated with customer devices 102(1), item delivery provider devices 106(1), and item service provider devices 110(1), to display a message such as "Food is ready to be picked up", respectively. The method then ends at step 448.

Back in step 440, when interconnection service device 116, determines that the received message identifier in the received communication is not "Merchant Ready". Then the method proceeds to take the no branch to step 450.

In step 450, interconnection service device 116, determines if the received message identifier in the received communication is "Merchant Delay". If interconnection service device 116 determines that the received communication includes a "Merchant Delay" identifier, then the method proceeds to take the yes branch to step 452.

In this step 452, interconnection service device 116 determines a response to message identifier "Merchant Delay", is to transmit an updated estimate time for food to be ready to, based on consulting the decision rule table. By way of example, interconnection service device 116 transmits an updated estimate time for food to be ready to customer device 102(1), item delivery provider device 106(1), and item service provider device 110(1). Further, when the customer device 102(1), item delivery provider device 106(1), and item service provider device 110(1) receive this response from corresponding server devices 122(1)-122(n), the received response updates food task interface at the customer device 102(1), item delivery provider device 106(1), and item service provider device 110(1) to display a new time of the food would be ready and the method proceeds to step 454.

In step 454, interconnection service device 116 accesses order messaging queue to identify which of the server devices 122(1)-122(n) associated with, in this example, customer device 102(1), item delivery provider device 106(1), and item service provider device 110(1) to transmit the response determined in step 452. Interconnection service device 116 accesses the order messaging queue to identify identifiers associated with customer device 102(1), item delivery provider device 106(1), and item service provider device 110(1) to and further identifies corresponding server devices 122(1)-122(n) associated with servicing customer device 102(1), item delivery provider device 106(1), and item service provider device 110(1). In this example, interconnection service device 116, identifies server device 122(1) to be associated with servicing customer 102(1), server device 122(2) to be associated with servicing item delivery provider device 106(1), and server device 122(3) to be associated with servicing item service provider device 110(1).

In step 456, interconnection service device 116 publishes the determined response to the server devices 122(1)-**122(*n*) associated with servicing the response. By way of example, interconnection service device 116 publishes or transmits the determined response to transmit updated estimate time for food to be ready to server device 122(1) associated with servicing customer 102(1), server device 122(2) associated with servicing item delivery provider device 106(1), and server device 122(3) associated with servicing item service provider device 110(1). Upon publishing the determines responses, the server devices 122(1), 122(2), and 122(*n*) updates food task interface and delivery task interface associated with customer devices 102(1), item delivery provider devices 106(1), and item service provider devices 110(1), to display a display a new time of the food would be ready. The method then ends at step 458**.

Back in step 450, when interconnection service device 116, determines that the received message identifier in the received communication is not "Merchant Delay". Then the method proceeds to take the no branch to step 458.

In step 458, interconnection service device 116, determines if the received message identifier in the received communication is "Merchant Cancel". If interconnection service device 116 determines that the received communication includes a "Merchant Cancel" identifier, then the method proceeds to take the yes branch to step 460.

In step 460, interconnection service device 116, determines a transmit a cancel order notification to customer device 102(1), item delivery provider device 106(1), and item service provider device 110(1). Interconnection service device 116 further issues a refund for the amount of payment made for the order request and the method proceeds to end at step 448.

Back in step 458, when interconnection service device 116, determines that the received message identifier in the received communication is not "Merchant Cancel", then the method takes the No branch to step 459 and transmits an error message, such as, "Invalid input" to, by way of example, item service provider device 110(1) from which the communication was received.

Figure 4D:
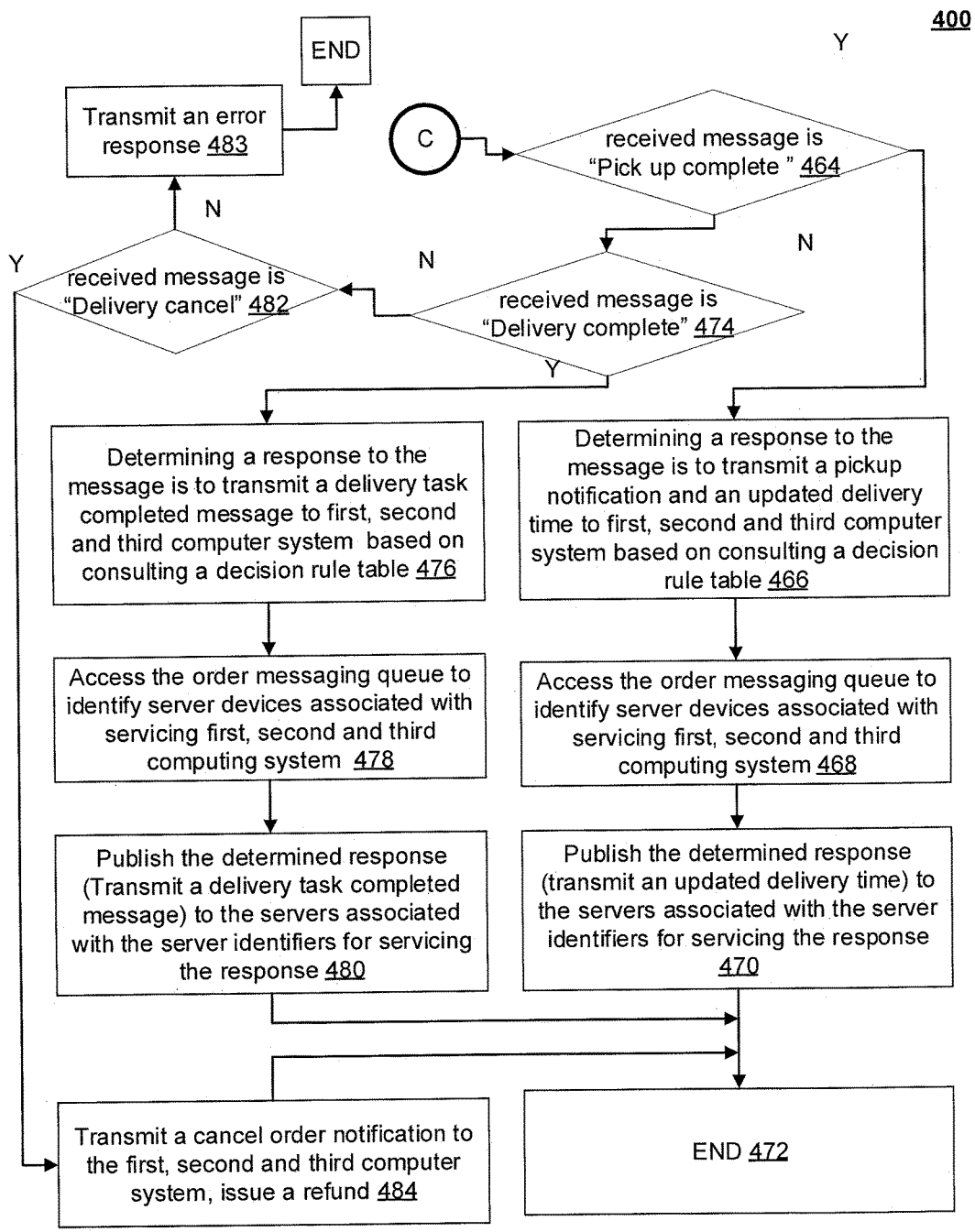

Back in step 436 (FIG. 4B), when interconnection service device 116, determines that the received communication is from one of the item delivery provider devices 106(1)-**106(*n*), then the interconnection service device 116, proceeds to step 462 to follow step 464** (FIG. 4D).

In step 464, interconnection service device 116, determines if the received message identifier in the received communication is "Pick up complete". If interconnection service device 116 determines that the received communication includes a "Pick up complete" identifier, then the method proceeds to take the yes branch to step 466.

In step 466, interconnection service device 116, consults a decision rule table to determine a response to the received communication based on the "Pick up complete" identifier.

Decision rule table is a table stored in the remote database 120. The decision rule table includes rules for providing a response based on the received identifier in the message. By way of example, a rule may be, for a "Pick up complete" identifier is to transmit an updated delivery time message to customer devices 102(1)-**102(*n*), item delivery provider devices 106(1)-106(*n*), and item service provider devices 110(1)-110(*n*), Updated delivery time message causes to update delivery task interface previously generated and displayed at customer devices 102(1)-102(*n*), item delivery provider devices 106(1)-106(*n*), and item service provider devices 110(1)-110(*n*), Another rule may be, for a "Delivery complete" identifier transmit a response for transmitting a message that the delivery has been successfully completed to customer devices 102(1)-102(*n*), item delivery provider devices 106(1)-106(*n*), and item service provider devices 110(1)-110(*n*), this response causes to update delivery task interface, that was generated on customer devices 102(1)-102(*n*), item delivery provider devices 106(1)-106(*n*), and item service provider devices 110(1)-110(*n*)**, to display delivery completed message.

In this step 466, based on consulting decision rule table, interconnection service device 116 determines a response to message identifier "Pick up complete", is to transmit an updated delivery time message to, by way of example, to customer device 102(1), item delivery provider device 106(1), and item service provider device 110(1) and the method proceeds to step 468.

In step 468, interconnection service device 116 accesses order messaging queue to identify server devices 122(1)-**122(*n*) associated with, in this example, customer device 102(1), item delivery provider device 106(1), and item service provider device 110(1) to transmit the response determined in step 466. Interconnection service device 116 accesses the order messaging queue to identify identifiers associated with customer device 102(1), item delivery provider device 106(1), and item service provider device 110(1) to and further identifies corresponding server devices 122(1)-122(*n*) associated with servicing customer device 102(1), item delivery provider device 106(1), and item service provider device 110(1). In this example, interconnection service device 116, identifies server device 122(1) to be associated with servicing customer 102(1), server device 122(2) to be associated with servicing item delivery provider device 106(1), and server device 122(3) to be associated with servicing item service provider device 110(1)**.

In step 470, interconnection service device 116 publishes the determined response to the server devices 122(1)-**122(*n*) associated with servicing the response. By way of example, interconnection service device 116 publishes or transmits updated delivery time message to, by way of example, to server device 122(1) associated with servicing customer 102(1), server device 122(2) associated with servicing item delivery provider device 106(1), and server device 122(3) associated with servicing item service provider device 110(1). Upon publishing the responses, the server devices 122(1), 122(2), and 122(*n*) updates delivery task interface and food task interface associated with customer devices 102(1), item delivery provider devices 106(1), and item service provider devices 110(1), to display a message such as "Food has been picked up", respectively. The method then ends at step 472**.

Back in step 464, when interconnection service device 116, determines that the received message identifier in the received communication is not "Pick up complete". Then the method proceeds to take the no branch to step 474.

In step 474, interconnection service device 116, determines if the received message identifier in the received communication is "Delivery Complete". If interconnection service device 116 determines that the received communication includes a "Merchant Complete" identifier, then the method proceeds to take the yes branch to step 476.

In this step 476, based on consulting decision rule table, interconnection service device 116 determines a response to message identifier "Delivery complete", is to transmit a response for transmitting a message that the delivery has been successfully completed to, by way of example, customer device 102(1), item delivery provider device 106(1), and item service provider device 110(1). Further, when the customer device 102(1), item delivery provider device 106(1), and item service provider device 110(1) receive this response, causes to update delivery task interface to display a message, such as, for example, "Item has been successfully delivered" and the method proceeds to step 478.

In step 478, interconnection service device 116 accesses order messaging queue to identify which of the server devices 122(1)-122(n) associated with, in this example, customer device 102(1), item delivery provider device 106(1), and item service provider device 110(1) to transmit the response determined in step 452. Interconnection service device 116 accesses the order messaging queue to identify identifiers associated with customer device 102(1), item delivery provider device 106(1), and item service provider device 110(1) to and further identifies corresponding server devices 122(1)-122(n) associated with servicing customer device 102(1), item delivery provider device 106(1), and item service provider device 110(1). In this example, interconnection service device 116, identifies server device 122(1) to be associated with servicing customer 102(1), server device 122(2) to be associated with servicing item delivery provider device 106(1), and server device 122(3) to be associated with servicing item service provider device 110(1).

In step 480, interconnection service device 116 publishes the determined response to the server devices 122(1)-122(n) associated with servicing the response. By way of example, interconnection service device 116 publishes or transmits a response for transmitting a message that the delivery has been successfully completed to server device 122(1) associated with servicing customer 102(1), server device 122(2) associated with servicing item delivery provider device 106(1), and server device 122(3) associated with servicing item service provider device 110(1). Server devices 122(1), 122(2), and 122(n) updates food task interface and delivery task interface, upon publishing the determines responses, associated with customer devices 102(1), item delivery provider devices 106(1), and item service provider devices 110(1), to display a display, for example, "item has been successfully delivered". The method then ends at step 472.

Back in step 474, when interconnection service device 116, determines that the received message identifier in the received communication is not "Delivery complete". Then the method proceeds to take the no branch to step 484.

In step 484, interconnection service device 116, determines if the received message identifier in the received communication is "Delivery Cancel". If interconnection service device 116 determines that the received communication includes a "Delivery Cancel" identifier, then the method proceeds to take the yes branch to step 484.

In step 484, interconnection service device 116, determines a transmit a cancel order notification to customer device 102(1), item delivery provider device 106(1), and item service provider device 110(1). Interconnection service device 116 further issues a refund for the amount of payment made for the order request and the method proceeds to end at step 472.

Back in step 482, when interconnection service device 116, determines that the received message identifier in the received communication is not "Delivery Cancel", then the method takes the No branch to step 483 and transmits an error message, such as, "Invalid input" to, by way of example, item service provider device 110(1) from which the communication was received and the method ends here.

Figure 4E:
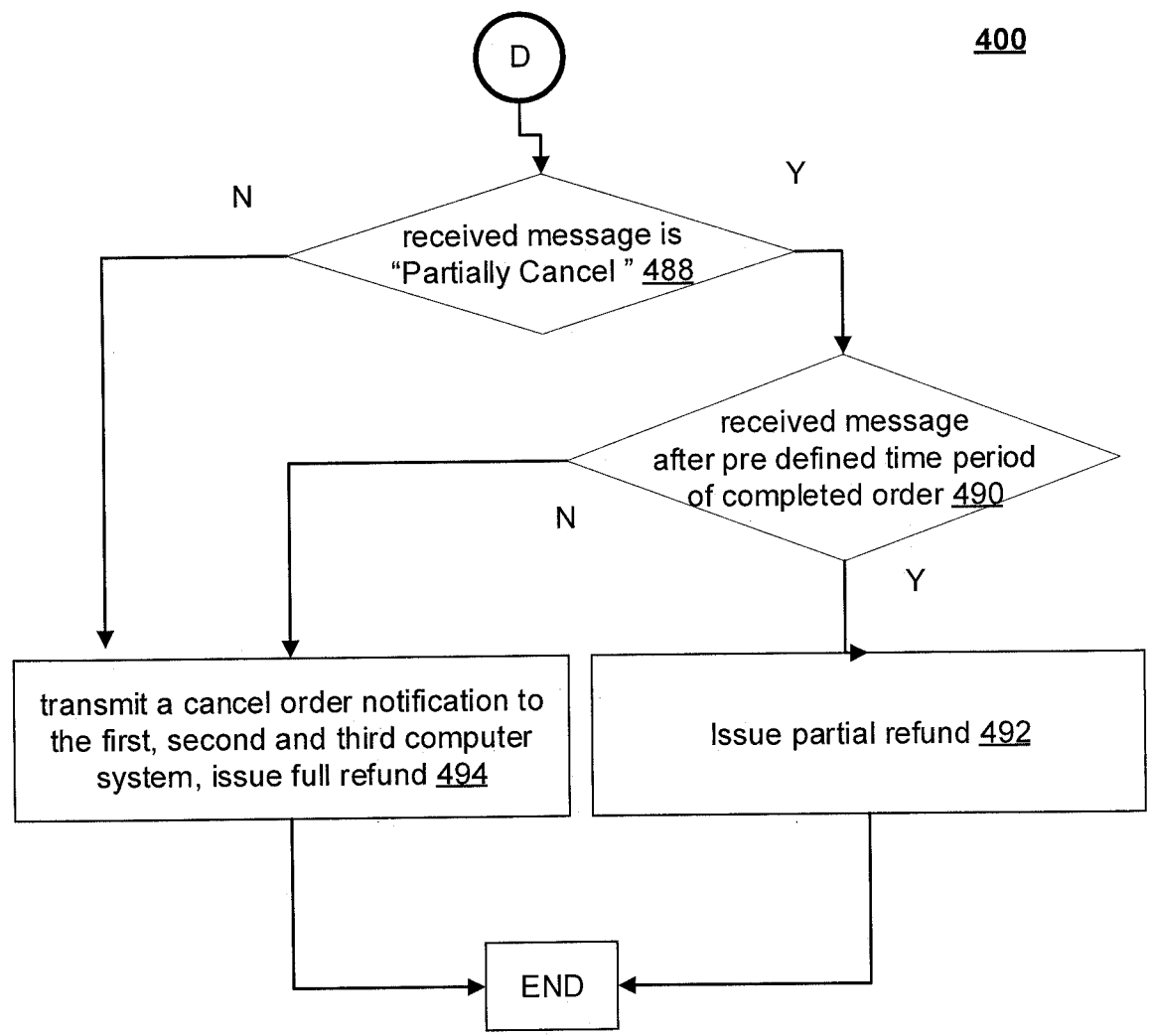

When in step 436 (FIG. 4B), interconnection service device 116, determines that the received communication is from one of the customer devices 102(1)-102(n), then the interconnection service device 116, proceeds to step 486 to follow step 488 (FIG. 4E).

In step 488, interconnection service device 116, determines if the received message identifier is "Partially Cancel", then the method takes the yes branch and proceeds to step 490.

In step 490, interconnection service device 116, determines if the received message is received after a pre-defined time period after completion of the order. Pre-defined time period may include 30 days after the item was successfully delivered. When interconnection service device 116, determines that the received message is received after 30 days of completion of the order, then the method proceeds to step 492.

In step 492, interconnection service device 116, issues a partial refund to customer device 102(1) associated with the order request.

When back in step 490, interconnection service device 116, determines that the received message is received within 30 days of completion of the order, then the method takes the no branch and proceeds to step 494.

Further, back in step 488, when interconnection service device 116, determines that the received message does not include a message identifier of "Partially Cancel", then the method takes the no branch and proceeds to step 494.

In step 494, interconnection service device 116, determines that the received communication is to complete cancel the order, and in response transmits a cancel order notification to the customer devices 102(1), item delivery provider devices 106(1), and item service provider devices 110(1) and further issues a full refund, and the method ends here.

The disclosed embodiments provide an improved method of interconnecting network devices based on queuing and servicing responses. By providing technical advantages of an optimized process of queuing to identify network responses by reducing data overhead and delays. As this technology provides a real time search queueing system to identify server devices 122(1)-112(n) that service request and responses, this technology provides a fast and reliable process of processing responses, which results in optimized user experience. Thus, this technology reduces delays caused during transmission of responses. Thus, this technology reduces data overhead, by utilizing queues to quickly identify server devices 122(1)-112(n) responsible for servicing requests.

In contrast, in the prior art, other strategies that have been implemented are inefficient as they require extra data overhead, which may not be beneficial to efficiently utilize network resources and thus increase network load. Further the prior art causes significant delays during a transmission of responses, while the disclosed embodiments provides a real time network interconnection, that reduces network delays between transmission of responses.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A computer-implemented system for interconnecting network devices based on queuing and servicing responses, the system comprising:
   a memory storing instructions; and
   at least one processor configured to execute the instructions to:
   receive, from a first computer system of a plurality of first computer systems via a network, an order request for a product or service associated with a second computer system of a plurality of second computer systems;
   instantiate an order messaging queue associated with the order request and add an identifier of the first computer system to the order messaging queue;
   display a confirmation request comprising the order request, via the network, on the second computer system;
   add an identifier of the second computer system to the order messaging queue;
   display a second confirmation request associated with a plurality of tasks on a plurality of third systems;
   add an identifier of one of the third computer systems to the order messaging queue;
   receive a communication from one of the first, second, or third computer systems, the communication comprising a message identifier and a device identifier;
   determine, based on at least one of the message identifier and the device identifier, the contents of the communication;
   based on determining contents of the communication, consult a response rule table to determine a response to the communication;
   determine which of the first, second or third computer systems are associated with servicing the determined response;
   access the order messaging queue to identify server devices corresponding with the first, second or third computer systems for servicing the determined response; and
   publish, to the identified server devices, the determined response for servicing.

2. The system of claim 1, wherein the instructions further cause the processor to:
   receive a response to the confirmation request from the second computer system.

3. The system of claim 2, wherein the response is an acceptance message to service the order request.

4. The system of claim 2, wherein the response is a message declining to service the order request.

5. The system of claim 1, wherein the instructions further cause the processor to:
   receive a response to the second confirmation request from one of the third computer systems.

6. The system of claim 5, wherein the response is an acceptance message to service the plurality of tasks.

7. The system of claim 5, wherein the response is a message declining to service the plurality of tasks.

8. The system of claim 1, wherein the contents of the communication comprises a message identifier, and wherein the message identifier comprises a merchant ready identifier, a merchant delay identifier, a merchant cancel identifier, a pickup complete identifier, a delivery complete identifier, a delivery cancel identifier, or partially cancel identifier.

9. The system of claim 1, wherein the instructions further cause the processor to:
   instantiate a first task associated with the preparation of product or service; and
   instantiate a second task associated with delivery of the product or service.

10. A computer implemented method for interconnecting network devices based on queuing and servicing responses, the method comprising:
    receiving, from a first computer system of a plurality of first computer systems via a network, an order request for a product or service associated with a second computer system of a plurality of second computer systems;
    instantiating an order messaging queue associated with the order request and add an identifier of the first computer system to the order messaging queue;
    displaying a confirmation request comprising the order request, via the network, on the second computer system;
    adding an identifier of the second computer system to the order messaging queue;
    displaying a second confirmation request associated with a plurality of tasks on a plurality of third systems;
    adding an identifier of one of the third computer systems to the order messaging queue;
    receiving a communication from one of the first, second, or third computer systems, the communication comprising a message identifier and a device identifier;
    determining, based on at least one of the message identifier and the device identifier, the contents of the communication;
    based on determining contents of the communication, consult a response rule table to determine a response to the communication;
    determining which of the first, second or third computer systems are associated with servicing the determined response;
    accessing the order messaging queue to identify server devices corresponding with the first, second or third computer systems for servicing the determined response;
    publishing, to the identified server devices, the determined response for servicing.

11. The method of claim 10, further comprising:
    receiving a response to the confirmation request from the second computer system.

12. The method of claim 11, wherein the response is an acceptance message to service the order request.

13. The method of claim 11, wherein the response is a message declining to service the order request.

14. The method of claim 10, further comprising:
    receiving a response to the second confirmation request from one of the third computer systems.

15. The method of claim 14, wherein the response is an acceptance message to service the plurality of tasks.

16. The method of claim 14, wherein the response is a message declining to service the plurality of tasks.

17. The method of claim 10, wherein the contents of the communication comprises a message identifier, and wherein the message identifier comprises a merchant ready identifier, a merchant delay identifier, a merchant cancel identifier, a pickup complete identifier, a delivery complete identifier, a delivery cancel identifier, or partially cancel identifier.

18. The method of claim 10, further comprising:
  instantiating a first task associated with the preparation of product or service; and
  instantiating a second task associated with delivery of the product or service.

19. A computer-implemented system for interconnecting network devices based on queuing and servicing responses, the system comprising:
  a memory storing instructions; and
  at least one processor configured to execute the instructions to:
  receive, from a first computer system of a plurality of first computer systems via a network, an order request for a product or service associated with a second computer system of a plurality of second computer systems;
  instantiate an order messaging queue associated with the order request and add an identifier of the first computer system to the order messaging queue;
  display a confirmation request comprising the order request, via the network, on the second computer system;
  receive a response to the confirmation request from the second computer system;
  add an identifier of the second computer system to the order messaging queue;
  display a second confirmation request associated with a plurality of tasks on a plurality of third systems;
  receive a response to the second confirmation request from one of the third computer system;
  add an identifier of the one of the third computer systems to the order messaging queue;
  receive a communication from one of the first, second, or third computer systems, the communication comprising a message identifier and a device identifier;
  determine, based on at least one of the message identifier and the device identifier, the contents of the communication;
  based on determining contents of the communication, consult a response rule table to determine a response to the communication;
  determine which of the first, second or third computer systems are associated with servicing the determined response;
  access the order messaging queue to identify server devices corresponding with the first, second or third computer systems for servicing the determined response;
  publish, to the identified server devices, the determined response for servicing.

\* \* \* \* \*